United States Patent
Hu et al.

(10) Patent No.: US 10,811,966 B1
(45) Date of Patent: Oct. 20, 2020

(54) DIGITAL CONSTANT ON-TIME CONTROLLER ADAPTABLE TO A DC-TO-DC CONVERTER

(71) Applicants: NCKU Research and Development Foundation, Tainan (TW); Himax Technologies Limited, Tainan (TW)

(72) Inventors: Kai-Yu Hu, Tainan (TW); Chien-Hung Tsai, Tainan (TW)

(73) Assignees: NCKU Research and Development Foundation, Tainan (TW); Himax Technologies Limited, Tainan (TW)

( * ) Notice: Subject to any disclaimer, the term of this patent is extended or adjusted under 35 U.S.C. 154(b) by 0 days.

(21) Appl. No.: 16/528,169

(22) Filed: Jul. 31, 2019

(51) Int. Cl.
*H02M 3/157* (2006.01)
*H02M 1/08* (2006.01)
*G05F 1/575* (2006.01)
*H02M 1/00* (2006.01)

(52) U.S. Cl.
CPC ............ *H02M 3/157* (2013.01); *G05F 1/575* (2013.01); *H02M 1/08* (2013.01); *H02M 2001/0009* (2013.01); *H02M 2001/0025* (2013.01)

(58) Field of Classification Search
CPC ...... H02M 3/156; H02M 3/157; H02M 3/158; H02M 3/335; H02M 2001/0009; H02M 1/08; G05F 1/565; G05F 1/575; G05F 1/46; H05B 33/0815
See application file for complete search history.

(56) References Cited

U.S. PATENT DOCUMENTS

| | | | | |
|---|---|---|---|---|
| 6,646,479 B1* | 11/2003 | Crawford | ............... | H03K 5/082 |
| | | | | 327/68 |
| 10,291,121 B1* | 5/2019 | Hu | .......... | H02M 3/158 |
| 2014/0070784 A1* | 3/2014 | Lynch | .................. | H02M 3/156 |
| | | | | 323/283 |
| 2014/0097817 A1* | 4/2014 | Liu | ........................ | H02M 3/157 |
| | | | | 323/283 |
| 2014/0268918 A1* | 9/2014 | Gong | ...................... | H05B 45/37 |
| | | | | 363/21.15 |
| 2016/0172974 A1* | 6/2016 | Teh | ........................ | H02M 3/158 |
| | | | | 323/271 |
| 2016/0285366 A1* | 9/2016 | Lee | ........................ | H05B 45/44 |
| 2019/0199209 A1* | 6/2019 | Shao | ...................... | H02M 3/158 |

* cited by examiner

*Primary Examiner* — Thienvu V Tran
*Assistant Examiner* — Nusrat Quddus
(74) *Attorney, Agent, or Firm* — Donald E. Stout; Stout, Uxa & Buyan, LLP (57) ABSTRACT

A digital constant on-time controller adaptable to a direct-current (DC)-to-DC converter includes a current sensing circuit that senses stored energy of the DC-to-DC converter, thereby generating a sense voltage; a semi-amplitude detector that detects half of a peak-to-peak amplitude of the sense voltage, thereby generating a semi-amplitude voltage; a DC voltage detector that detects a DC voltage across an effective series resistor of an energy storage circuit that provides the stored energy of the DC-to-DC converter, thereby generating a DC voltage; an arithmetic device that adds the sense voltage and the semi-amplitude voltage, from which the DC voltage and a predetermined reference signal are subtracted; and a pulse-width modulation (PWM) generator that generates a switch control signal according to a result of the arithmetic device.

13 Claims, 8 Drawing Sheets

DIGITAL CONSTANT ON-TIME CONTROLLER ADAPTABLE TO A DC-TO-DC CONVERTER

BACKGROUND OF THE INVENTION

1. Field of the Invention

The present invention generally relates to a DC-to-DC converter, and more particularly to a DC-to-DC converter with output voltage offset cancellation.

2. Description of Related Art

A power converter is an electronic circuit that converts electric energy from one form to another. A DC-to-DC converter is a type of power converter that converts a direct-current (DC) source from one voltage level to another. In the DC-to-DC converter, an inductor disposed between a switch circuit and an output node is commonly used to store energy.

An analog current sensing circuit is ordinarily adopted in the DC-to-DC converter to sense the inductor current, which is utilized to control the switching of the switch circuit. For a constant on-time (COT) DC-to-DC converter, an analog ripple-based control is adopted by comparing the sensed inductor current with a reference voltage to generate a control signal for controlling the switch circuit. Unfortunately, this scheme disadvantageously introduces some output voltage offset error, which degenerates regulation performance of the DC-to-DC converter.

A need has thus arisen to propose a novel DC-to-DC converter with output voltage offset improvement.

SUMMARY OF THE INVENTION

In view of the foregoing, it is an object of the embodiment of the present invention to provide a DC-to-DC converter with output voltage offset cancellation, particularly a digital constant on-time controller adaptable to the DC-to-DC converter for effectively cancelling the output voltage offset.

According to one embodiment, a digital constant on-time controller adaptable to a direct-current (DC)-to-DC converter includes a current sensing circuit, a semi-amplitude detector, a DC voltage detector, an arithmetic device and a pulse-width modulation (PWM) generator. The current sensing circuit senses stored energy of the DC-to-DC converter, thereby generating a sense voltage. The semi-amplitude detector detects half of a peak-to-peak amplitude of the sense voltage, thereby generating a semi-amplitude voltage. The DC voltage detector detects a DC voltage across an effective series resistor of an energy storage circuit that provides the stored energy of the DC-to-DC converter, thereby generating a DC voltage. The arithmetic device adds the sense voltage and the semi-amplitude voltage, from which the DC voltage and a predetermined reference signal are subtracted. The PWM generator generates a switch control signal according to a result of the arithmetic device.

DETAILED DESCRIPTION OF THE INVENTION

Figure 1A:
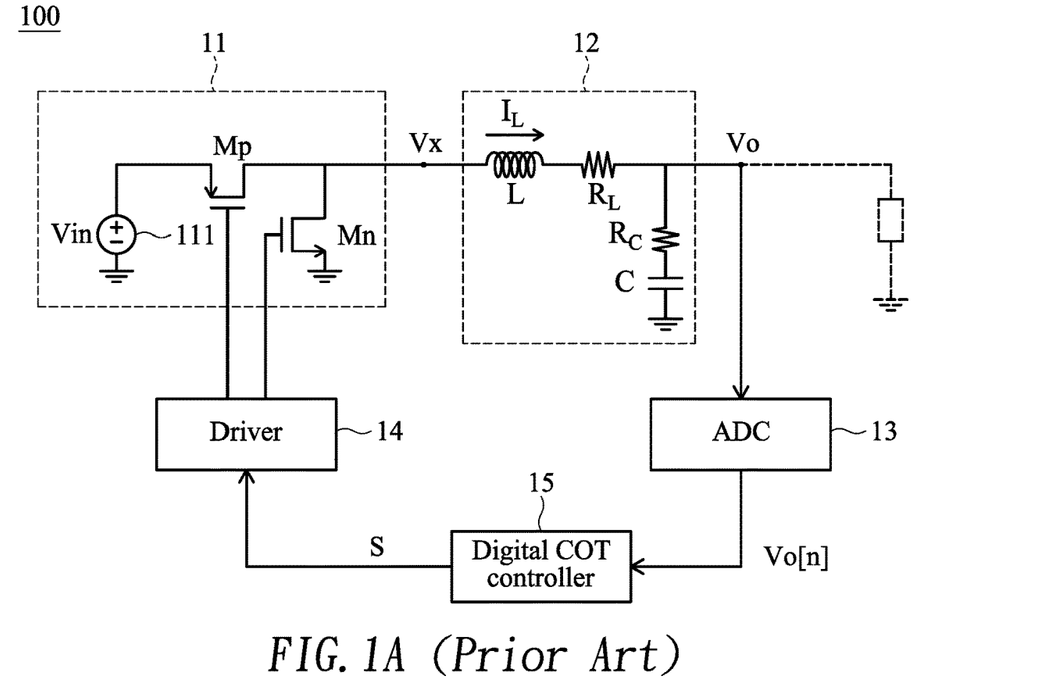
FIG. 1A shows a circuit diagram illustrating a DC-to-DC converter 100 with output voltage offset cancellation.

FIG. 1A shows a circuit diagram illustrating a DC-to-DC converter 100 with output voltage offset cancellation, which is disclosed in U.S. application Ser. No. 16/153,467 by Applicant, now U.S. Pat. No. 10,291,121, filed on Oct. 5, 2018 and entitled DC-TO-DC CONVERTER AND A DIGITAL CONSTANT ON-TIME CONTROLLER THEREOF, the entire contents of which are hereby incorporated by reference. The DC-to-DC converter 100 may include a switch circuit 11 configured to generate a switch voltage Vx. Specifically, the switch circuit 11 may include a first switch device Mp and a second switch device Mn series connected between a power supply 111 and ground. The power supply 111 is configured to supply an input voltage Vin. The switch voltage Vx is generated at a switch node Vx intermediate between the first switch device Mp and the second switch device Mn.

The DC-to-DC converter 100 may include an energy storage circuit 12 coupled to receive the switch voltage Vx, and configured to generate a regulated output voltage Vo providing to a load. Specifically, the energy storage circuit 12 may include an inductor L and an effective series resistor $R_L$ connected in series between the switch node Vx and an output node Vo, and an capacitor C and an effective series resistor Rc connected in series between the output node Vo and ground.

The DC-to-DC converter 100 may include an analog-to-digital converter (ADC) 13 configured to generate a digital output voltage Vo[n] equivalent to the (analog) output voltage Vo. The DC-to-DC converter 100 may include a driver 14 (e.g., an amplifier) configured to generate drive signals for driving the switch circuit 11. Specifically, the driver 14 may generate a drive signal for driving the first switch device Mp and an inverted drive signal for driving the second switch device Mn.

The DC-to-DC converter 100 may include a digital constant on-time (COT) controller 15 coupled to receive the digital output voltage Vo[n], and configured to generate a switch control signal S being fed to the driver 14. The digital COT controller 15 is configured to generate a constant on-time (COT) switch control signal S according to stored energy (e.g., an inductor current $I_L$ flowing through the inductor L) of the energy storage circuit 12.

Figure 1B:
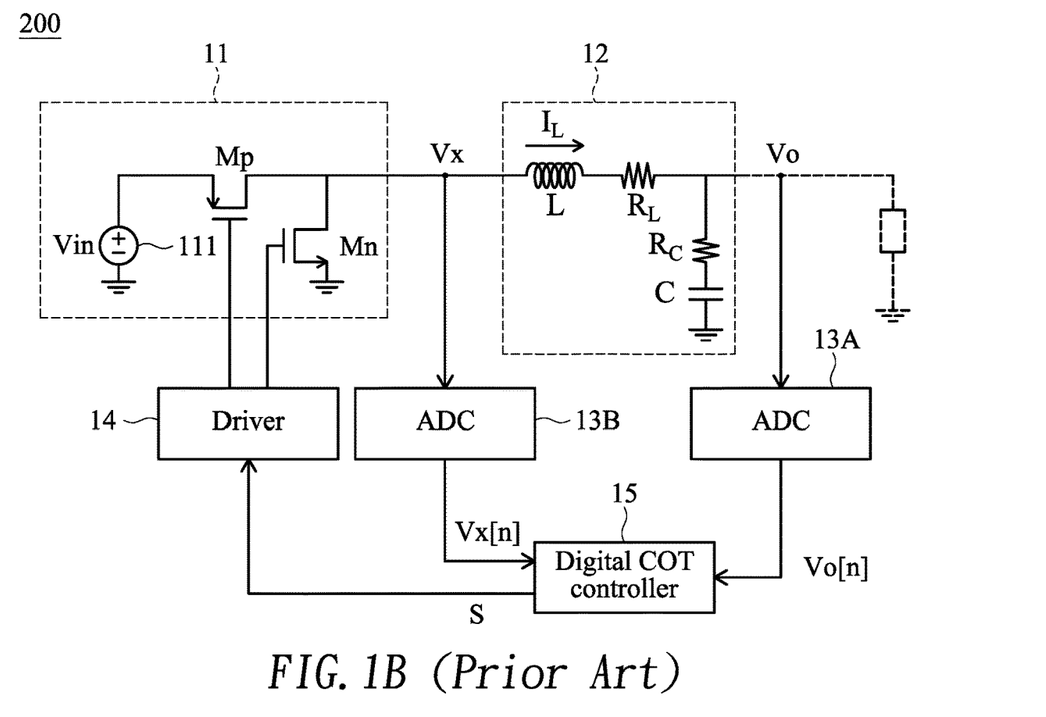
FIG. 1B shows a circuit diagram illustrating a DC-to-DC converter with output voltage offset cancellation.

FIG. 1B shows a circuit diagram illustrating a DC-to-DC converter 200 with output voltage offset cancellation, which is disclosed in the Application mentioned above. The DC-to-DC converter 200 of FIG. 1B is similar to the DC-to-DC converter 100 of FIG. 1A with the following exceptions. In FIG. 1B, a first ADC 13A is configured to generate a digital output voltage Vo[n] equivalent to the (analog) output voltage Vo, and a second ADC 13B is configured to generate a digital switch voltage Vx[n] equivalent to the (analog) switch voltage Vx. Accordingly, the digital COT controller 15 of the second embodiment generates the switch control signal S according to both the digital output voltage Vo[n] and the digital switch voltage Vx[n], instead of only the digital output voltage Vo[n] as in FIG. 1A.

Figure 2A:
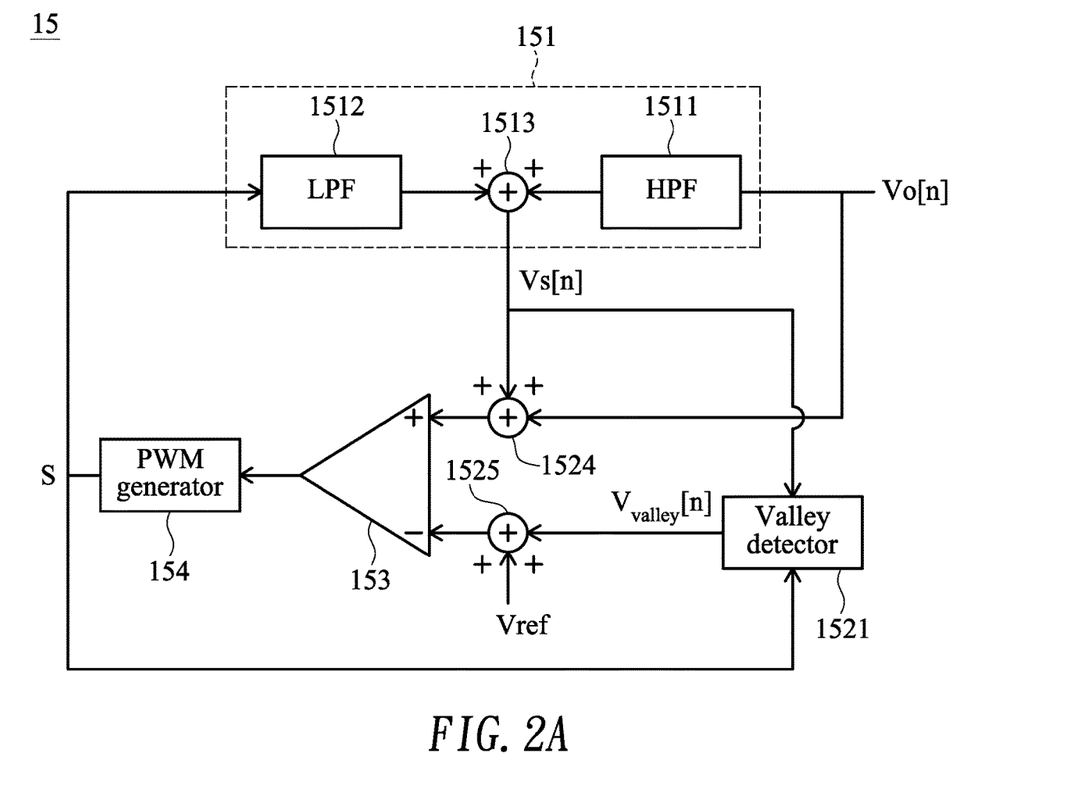
FIG. 2A shows a block diagram illustrating a digital COT controller according to a first embodiment of the present invention.
Figure 2B:
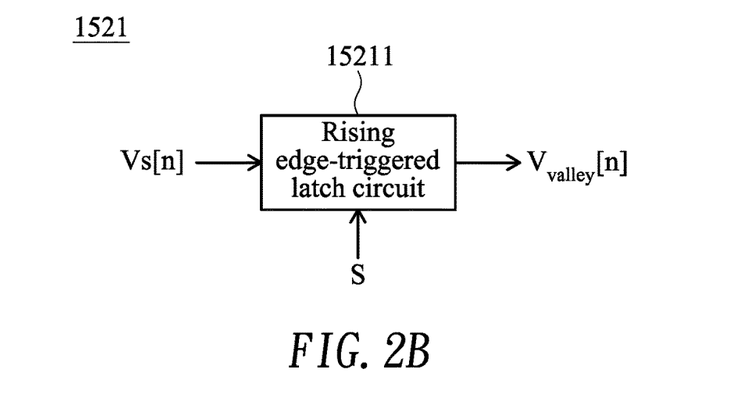
FIG. 2B shows a detailed block diagram illustrating the valley detector of FIG. 2A.

FIG. 2A shows a block diagram illustrating a digital constant on-time (COT) controller 15 according to a first embodiment of the present invention. In the embodiment, the COT controller 15 may include a first arithmetic device 1524 configured to add a sense voltage Vs[n] (from a current sensing circuit 151) and a digital output voltage Vo[n], thereby generating a first signal fed to a first input node (e.g., positive (+) input node) of a comparator 153. The COT controller 15 of the embodiment may include a valley detector 1521 configured to detect a valley (or minimum) value of the sense voltage Vs[n], thereby generating a valley voltage $V_{valley}$[n]. FIG. 2B shows a detailed block diagram illustrating the valley detector 1521 of FIG. 2A. Specifically, the valley detector 1521 may include a rising edge-triggered latch circuit 15211 configured to latch (or sample) the sense voltage Vs[n], for example, triggered on a rising edge of a switch control signal S, thereby generating the valley voltage $V_{valley}$[n].

The COT controller 15 of the embodiment may include a second arithmetic device 1525 configured to add the valley voltage $V_{valley}$[n] and a predetermined reference signal Vref, thereby generating a second signal fed to a second input node (e.g., negative (−) input node) of the comparator 153. A comparison result of the comparator 153 may be fed to a pulse-width modulation (PWM) generator 154 configured to generate the switch control signal S. The comparator 153, the first arithmetic device 1524 and the second arithmetic device 1525 constitute an arithmetic device of the embodiment. In the embodiment, the comparison result of the comparator 153 may be expressed as follows:

first signal−second signal=$(Vs[n]+Vo[n])-(Vref+V_{valley}[n])$

Figure 2C:
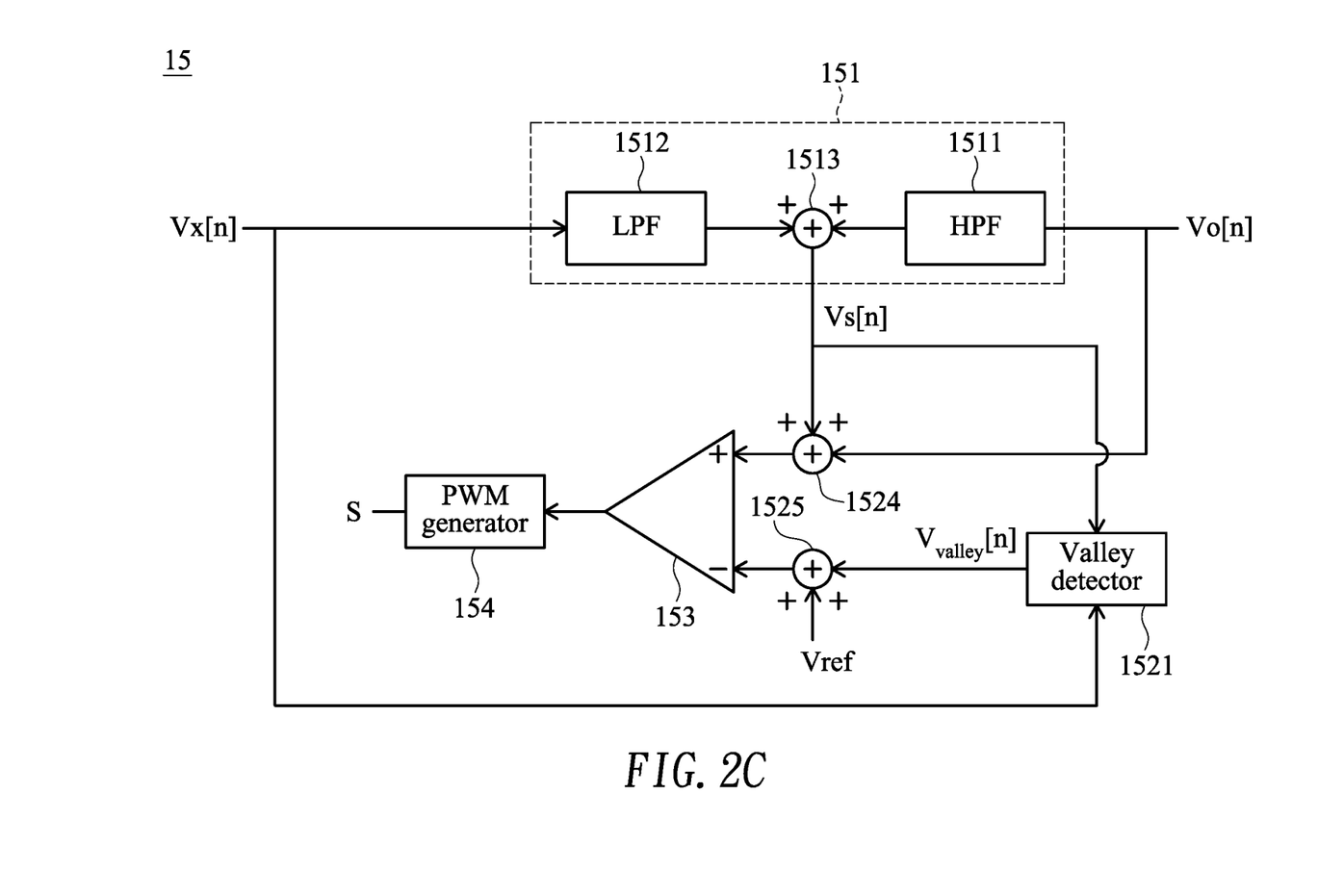
FIG. 2C shows a block diagram illustrating a digital COT controller according to an alternative first embodiment of the present invention.

FIG. 2C shows a block diagram illustrating a digital constant on-time (COT) controller 15 according to an alternative first embodiment of the present invention. In the embodiment, the digital COT controller 15 generates the switch control signal S according to both the digital output voltage Vo[n] and the digital switch voltage Vx[n], instead of only the digital output voltage Vo[n] as in FIG. 2A. Specifically, the LPF 1512 of the current sensing circuit 151 performs according to the digital switch voltage Vx[n], instead of the switch control signal S as in FIG. 2A.

Figure 3A:
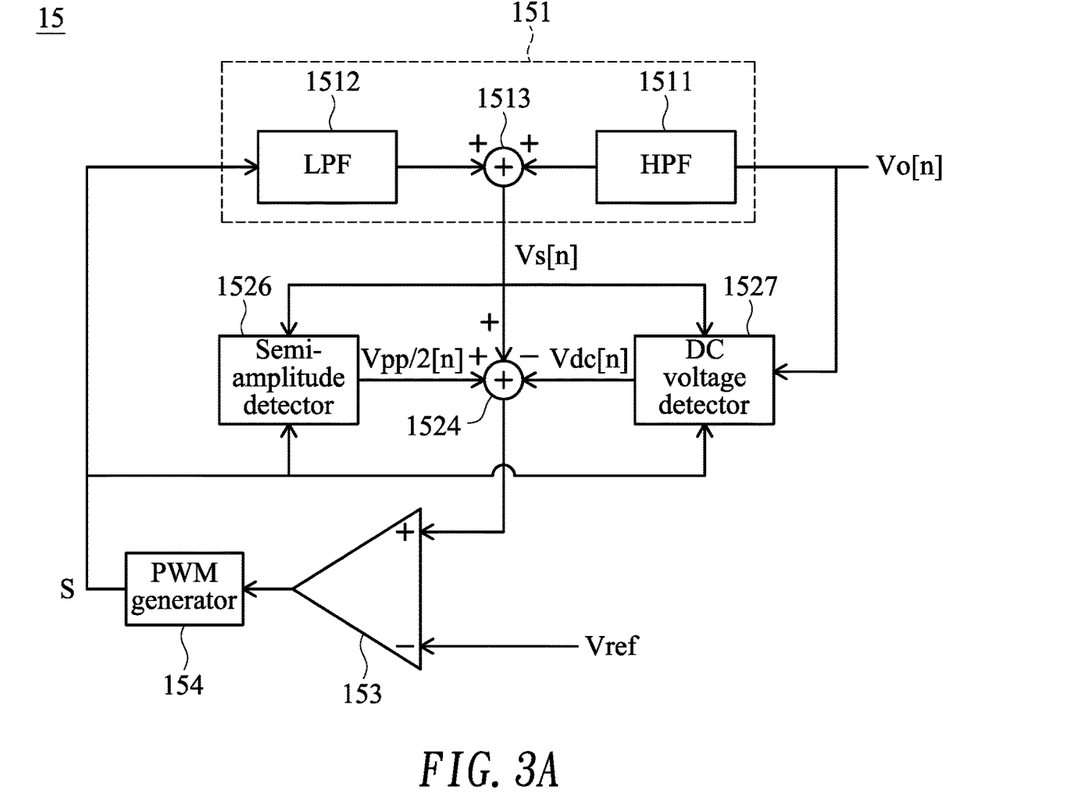
FIG. 3A shows a block diagram illustrating a digital COT controller according to a second embodiment of the present invention.
Figure 3B:
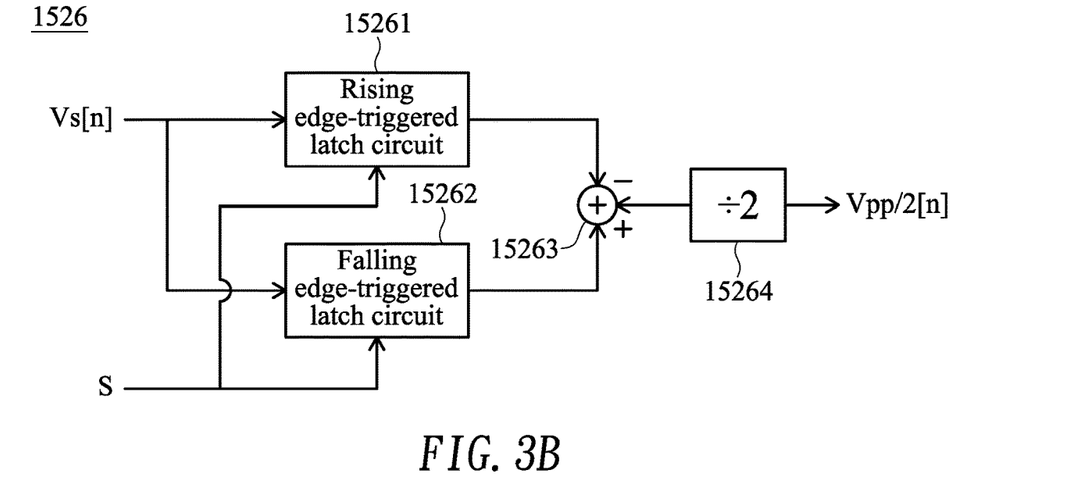
FIG. 3B shows a detailed block diagram illustrating the semi-amplitude detector of FIG. 3A.

FIG. 3A shows a block diagram illustrating a digital constant on-time (COT) controller 15 according to a second embodiment of the present invention. In the embodiment, the COT controller 15 may include a semi-amplitude detector 1526 configured to detect half of a peak-to-peak amplitude of the sense voltage Vs[n] (from the current sensing circuit 151), thereby generating a semi-amplitude voltage Vpp/2[n]. FIG. 3B shows a detailed block diagram illustrating the semi-amplitude detector 1526 of FIG. 3A. Specifically, the semi-amplitude detector 1526 may include a rising edge-triggered latch circuit 15261 configured to latch (or sample) the sense voltage Vs[n], for example, triggered on a rising edge of a switch control signal S, thereby generating a minimum value. The semi-amplitude detector 1526 may include a falling edge-triggered latch circuit 15262 configured to latch (or sample) the sense voltage Vs[n], for example, triggered on a falling edge of the switch control signal S, thereby generating a maximum value. The semi-amplitude detector 1526 may include an adder 15263 configured to subtract the minimum value from the maximum value, thereby generating a peak-to-peak value. The semi-amplitude detector 1526 may include a divided-by-2 device 15264 configured to mathematically divide the peak-to-peak value by 2 (in value), thereby generating the semi-amplitude voltage Vpp/2[n].

Figure 3C:
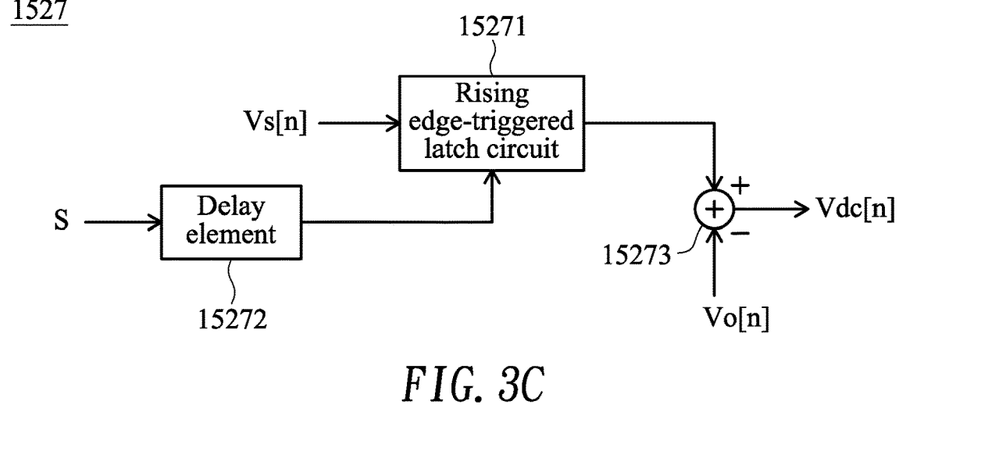
FIG. 3C shows a detailed block diagram illustrating the DC voltage detector of FIG. 3A.

The COT controller 15 of the embodiment may include a direct-current (DC) voltage detector 1527 configured to detect a DC voltage (i.e., $R_L I_{L(DC)}$) of a voltage across the effective series resistor $R_L$ of the energy storage circuit 12 that provides the stored energy of the DC-to-DC converter, thereby generating a DC voltage Vdc[n]. FIG. 3C shows a detailed block diagram illustrating the DC voltage detector 1527 of FIG. 3A. Specifically, the DC voltage detector 1527 may include a rising edge-triggered latch circuit 15271 configured to latch (or sample) the sense voltage Vs[n], for example, triggered on a rising edge of a delayed switch control signal S that is delayed for half on-time period by a delay element 15272, thereby generating an intermediate value representing a DC voltage at a node between the inductor L and an effective series resistor $R_L$. The DC voltage detector 1527 may include an adder 15273 configured to subtract the digital output voltage Vo[n] from the intermediate value, thereby generating the DC voltage Vdc[n].

The COT controller 15 of the embodiment may include a first arithmetic device 1524 configured to add the sense voltage Vs[n] and the semi-amplitude voltage Vpp/2[n], from which the DC voltage Vdc[n] is subtracted, thereby generating a first signal fed to a first input node (e.g., positive (+) input node) of a comparator 153. A reference signal Vref is provided as a second signal fed to a second input node (e.g., negative (−) input node) of the comparator 153. A comparison result of the comparator 153 may be fed to a pulse-width modulation (PWM) generator 154 configured to generate a switch control signal S. The comparator 153 and the first arithmetic device 1524 constitute an arithmetic device of the embodiment. In the embodiment, the comparison result of the comparator 153 may be expressed as follows:

first signal−second signal=$(Vs[n]+Vpp/2[n]-Vdc[n])-Vref$

Figure 3D:
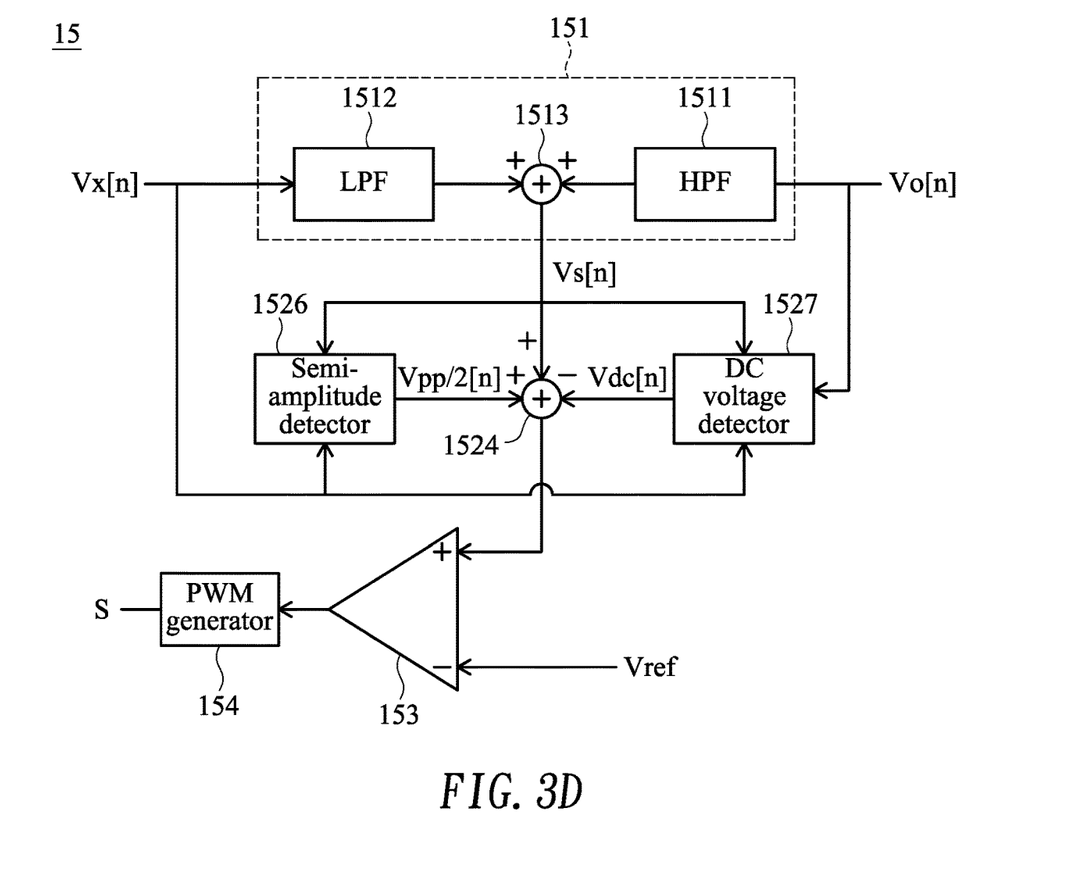
FIG. 3D shows a block diagram illustrating a digital COT controller according to an alternative second embodiment of the present invention.

FIG. 3D shows a block diagram illustrating a digital constant on-time (COT) controller 15 according to an alternative second embodiment of the present invention. In the embodiment, the digital COT controller 15 generates the switch control signal S according to both the digital output voltage Vo[n] and the digital switch voltage Vx[n], instead of only the digital output voltage Vo[n] as in FIG. 3A. Specifically, the LPF 1512 of the current sensing circuit 151, the semi-amplitude detector 1526 and the DC voltage detector 1527 perform according to the digital switch voltage Vx[n], instead of the switch control signal S as in FIG. 3A.

Figure 4A:
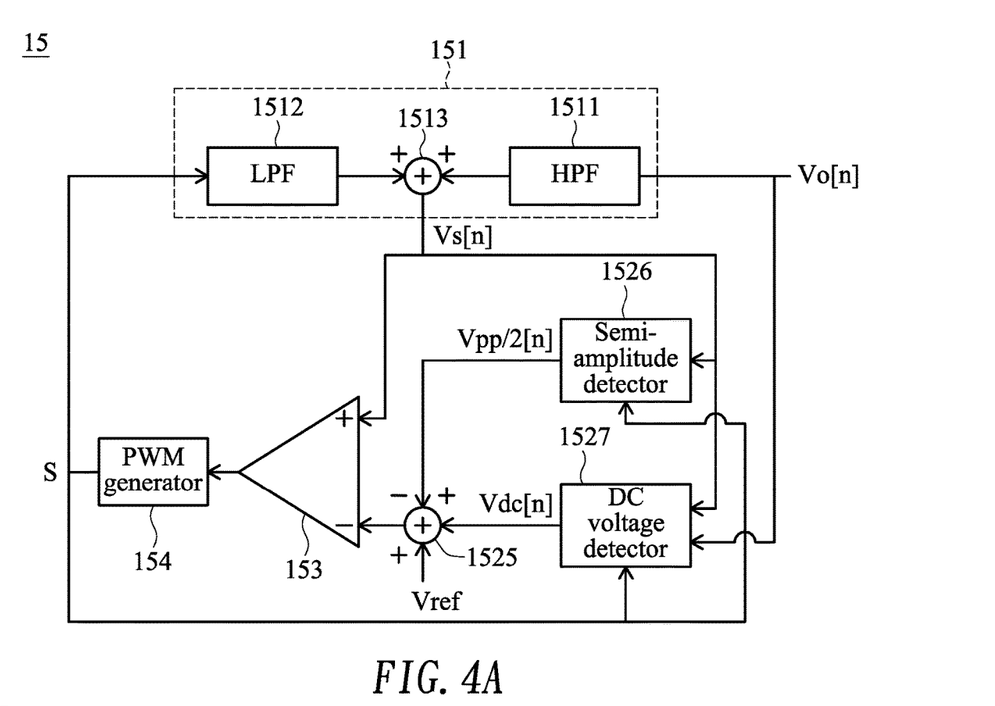
FIG. 4A shows a block diagram illustrating a digital COT controller according to a third embodiment of the present invention.

FIG. 4A shows a block diagram illustrating a digital constant on-time (COT) controller 15 according to a third embodiment of the present invention. In the embodiment, a sense voltage Vs[n](from the current sensing circuit 151), as a first signal, is fed to a first input node (e.g., positive (+) input node) of a comparator 153. The COT controller of the embodiment may include a second arithmetic device 1525 configured to add a reference signal Vref and a DC voltage Vdc[n] (from a DC voltage detector 1527), from which a semi-amplitude voltage Vpp/2[n] (from a semi-amplitude detector 1526) is subtracted, thereby generating a second signal fed to a second input node (e.g., negative (−) input node) of the comparator 153. A comparison result of the comparator 153 may be fed to a pulse-width modulation (PWM) generator 154 configured to generate a switch control signal S. The comparator 153 and the second arithmetic device 1525 constitute an arithmetic device of the embodiment. In the embodiment, the comparison result of the comparator 153 may be expressed as follows:

first signal−second signal=$Vs[n]$−($Vref$−$Vpp/2[n]$+$Vdc[n]$)

Figure 4B:
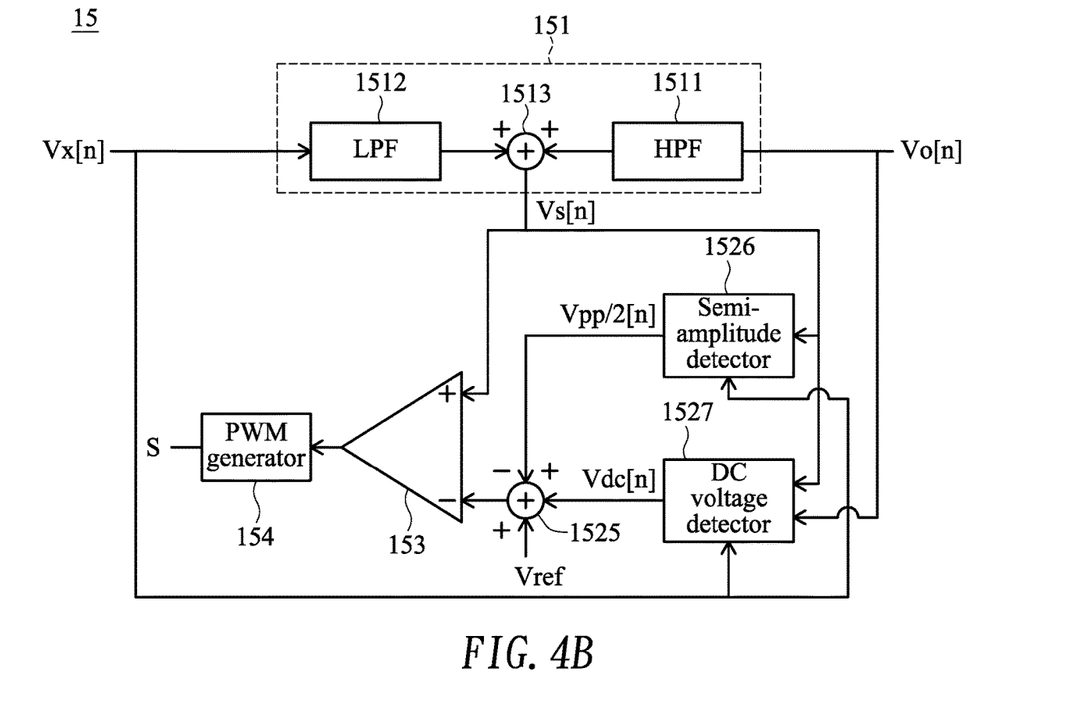
FIG. 4B shows a block diagram illustrating a digital COT controller according to an alternative third embodiment of the present invention.

FIG. 4B shows a block diagram illustrating a digital constant on-time (COT) controller 15 according to an alternative third embodiment of the present invention. In the embodiment, the digital COT controller 15 generates the switch control signal S according to both the digital output voltage Vo[n] and the digital switch voltage Vx[n], instead of only the digital output voltage Vo[n] as in FIG. 4A. Specifically, the LPF 1512 of the current sensing circuit 151 performs according to the digital switch voltage Vx[n], instead of the switch control signal S as in FIG. 4A.

Figure 5A:
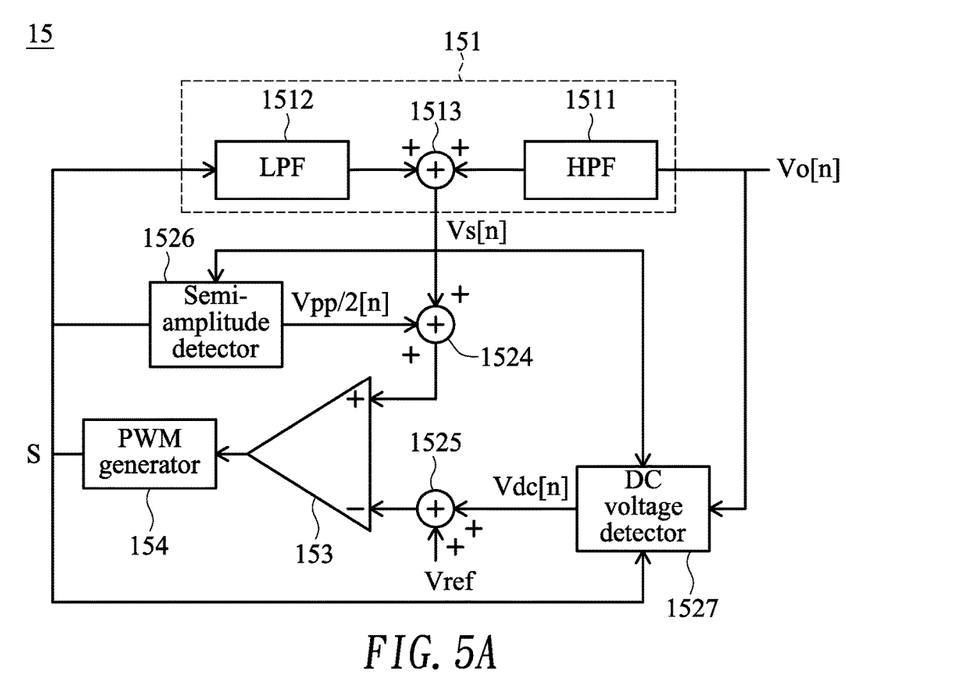
FIG. 5A shows a block diagram illustrating a digital COT controller according to a fourth embodiment of the present invention.

FIG. 5A shows a block diagram illustrating a digital constant on-time (COT) controller 15 according to a fourth embodiment of the present invention. In the embodiment, the COT controller 15 may include a first arithmetic device 1524 configured to add a sense voltage Vs[n] (from the current sensing circuit 151) and a semi-amplitude voltage Vpp/2[n] (from a semi-amplitude detector 1526), thereby generating a first signal fed to a first input node (e.g., positive (+) input node) of a comparator 153. The COT controller of the embodiment may include a second arithmetic device 1525 configured to add a reference signal Vref and a DC voltage Vdc[n] (from a DC voltage detector 1527), thereby generating a second signal fed to a second input node (e.g., negative (−) input node) of the comparator 153. A comparison result of the comparator 153 may be fed to a pulse-width modulation (PWM) generator 154 configured to generate a switch control signal S. The comparator 153, the first arithmetic device 1524 and the second arithmetic device 1525 constitute an arithmetic device of the embodiment. In the embodiment, the comparison result of the comparator 153 may be expressed as follows:

first signal−second signal=($Vs[n]$+$Vpp/2[n]$)−($Vref$+$Vdc[n]$)

Figure 5B:
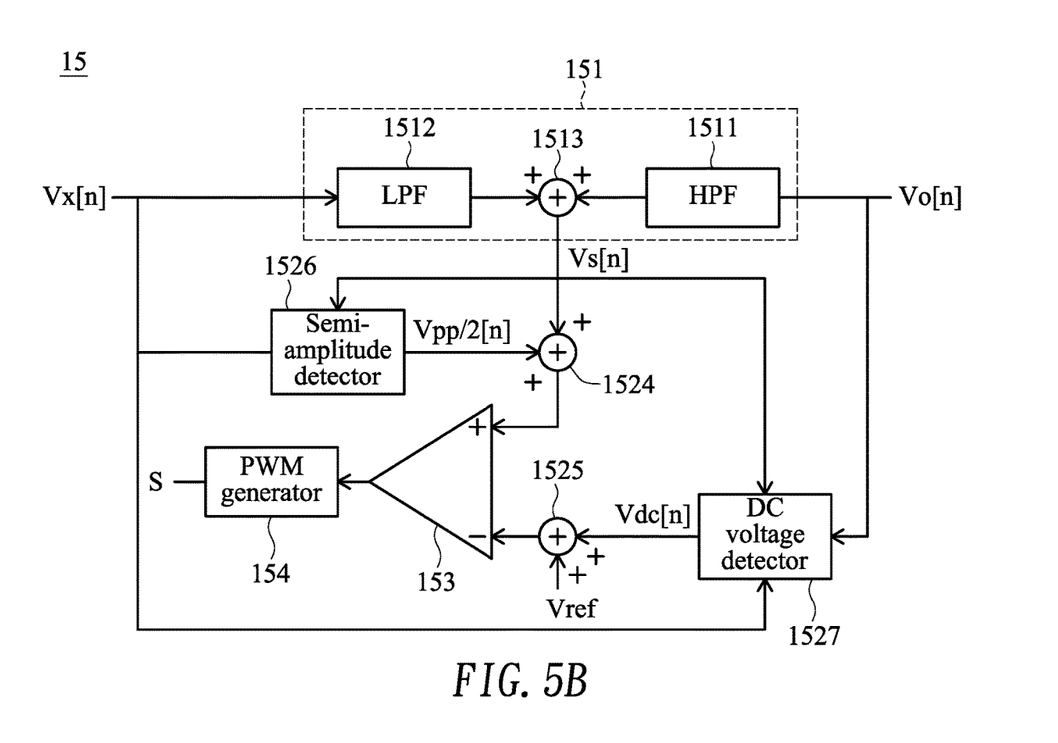
FIG. 5B shows a block diagram illustrating a digital COT controller according to an alternative fourth embodiment of the present invention.

FIG. 5B shows a block diagram illustrating a digital constant on-time (COT) controller 15 according to an alternative fourth embodiment of the present invention. In the embodiment, the digital COT controller 15 generates the switch control signal S according to both the digital output voltage Vo[n] and the digital switch voltage Vx[n], instead of only the digital output voltage Vo[n] as in FIG. 5A. Specifically, the LPF 1512 of the current sensing circuit 151 and the semi-amplitude detector 1526 perform according to the digital switch voltage Vx[n], instead of the switch control signal S as in FIG. 5A.

Figure 6A:
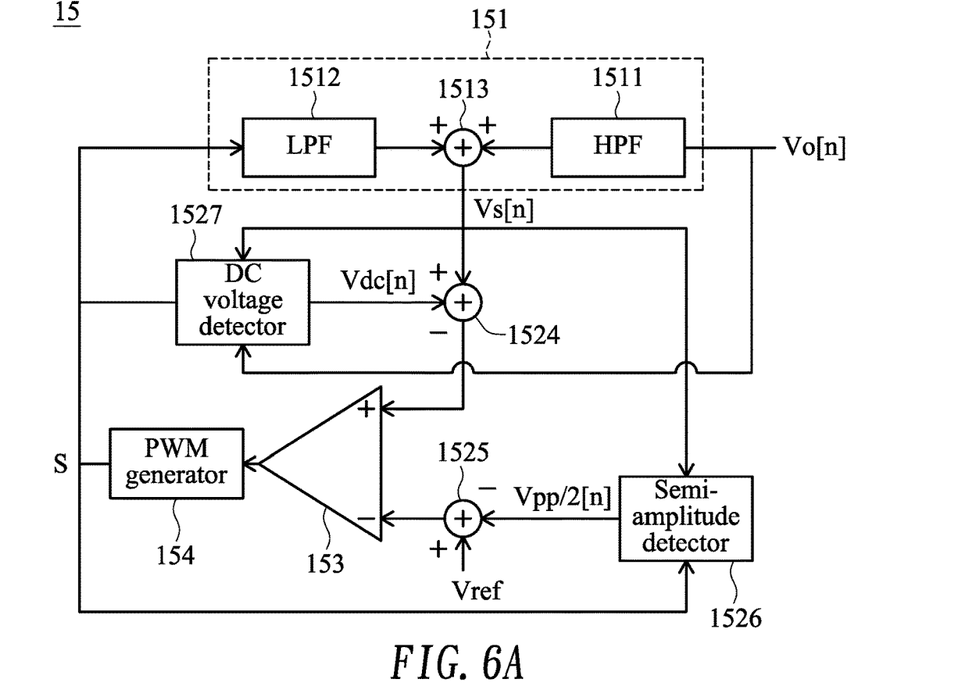
FIG. 6A shows a block diagram illustrating a digital COT controller according to a fifth embodiment of the present invention.

FIG. 6A shows a block diagram illustrating a digital constant on-time (COT) controller 15 according to a fifth embodiment of the present invention. In the embodiment, the COT controller 15 may include a first arithmetic device 1524 configured to subtract a DC voltage Vdc[n] (from a DC voltage detector 1527) from a sense voltage Vs[n] (from the current sensing circuit 151), thereby generating a first signal fed to a first input node (e.g., positive (+) input node) of a comparator 153. The COT controller 15 of the embodiment may include a second arithmetic device 1525 configured to subtract a semi-amplitude voltage Vpp/2[n] (from a semi-amplitude detector 1526) from a reference signal Vref, thereby generating a second signal fed to a second input node (e.g., negative (−) input node) of the comparator 153. A comparison result of the comparator 153 may be fed to a pulse-width modulation (PWM) generator 154 configured to generate a switch control signal S. The comparator 153, the first arithmetic device 1524 and the second arithmetic device 1525 constitute an arithmetic device of the embodiment. In the embodiment, the comparison result of the comparator 153 may be expressed as follows:

first signal−second signal=($Vs[n]$−$Vdc[n]$)−($Vref$−$Vpp/2[n]$)

Figure 6B:
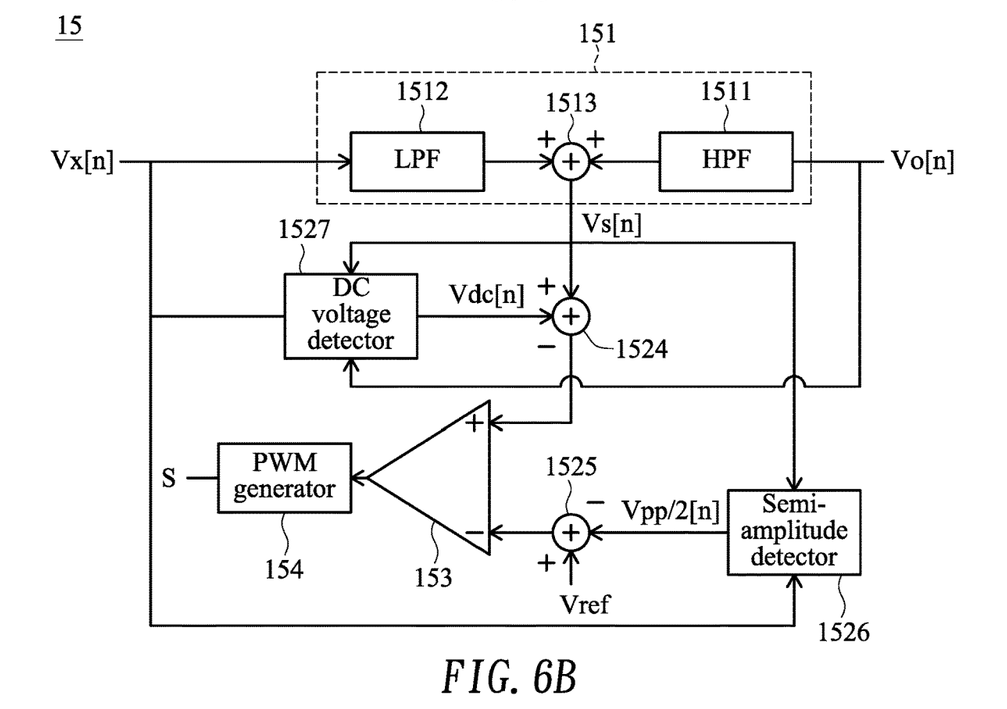
FIG. 6B shows a block diagram illustrating a digital COT controller according to an alternative fifth embodiment of the present invention.

FIG. 6B shows a block diagram illustrating a digital constant on-time (COT) controller 15 according to an alternative fifth embodiment of the present invention. In the embodiment, the digital COT controller 15 generates the switch control signal S according to both the digital output voltage Vo[n] and the digital switch voltage Vx[n], instead of only the digital output voltage Vo[n] as in FIG. 6A. Specifically, the LPF 1512 of the current sensing circuit 151 and the DC voltage detector 1527 perform according to the digital switch voltage Vx[n], instead of the switch control signal S as in FIG. 6A.

Although specific embodiments have been illustrated and described, it will be appreciated by those skilled in the art that various modifications may be made without departing from the scope of the present invention, which is intended to be limited solely by the appended claims.

What is claimed is:

1. A digital constant on-time (COT) controller adaptable to a direct-current (DC)-to-DC converter, comprising:
   a current sensing circuit that senses stored energy of the DC-to-DC converter, thereby generating a sense voltage;
   a semi-amplitude detector that detects half of a peak-to-peak amplitude of the sense voltage, thereby generating a semi-amplitude voltage;
   a DC voltage detector that detects a DC voltage across an effective series resistor of an energy storage circuit that provides the stored energy of the DC-to-DC converter, thereby generating a DC voltage;

an arithmetic device that adds the sense voltage and the semi-amplitude voltage, from which the DC voltage and a predetermined reference signal are subtracted; and a pulse-width modulation (PWM) generator that generates a switch control signal according to a result of the arithmetic device;

wherein the arithmetic device comprises:
- a comparator with a first input node and a second input node, a comparison result of the comparator being fed to the PWM generator; and
- a first arithmetic device that adds the sense voltage and the semi-amplitude voltage, from which the DC voltage is subtracted, thereby generating a first signal fed to the first input node;
- wherein the predetermined reference signal is provided as a second signal fed to the second input node.

2. The controller of claim 1, wherein the semi-amplitude detector comprises:
- a rising edge-triggered latch circuit that latches the sense voltage triggered on a rising edge of the switch control signal or a digital switch voltage, thereby generating a minimum value;
- a falling edge-triggered latch circuit that latches the sense voltage triggered on a falling edge of the switch control signal or the digital switch voltage, thereby generating a maximum value;
- an adder that subtracts the minimum value from the maximum value, thereby generating a peak-to-peak value; and
- a divided-by-2 device that mathematically divides the peak-to-peak value by 2, thereby generating the semi-amplitude voltage.

3. The controller of claim 1, wherein the DC voltage detector comprises:
- a delay element that delays the switch control signal or a digital switch voltage for half on-time period, thereby generating a delayed switch control signal;
- a rising edge-triggered latch circuit that latches the sense voltage triggered on a rising edge of the delayed switch control signal or the delayed digital switch voltage, thereby generating an intermediate value; and
- an adder that subtracts a digital output voltage of the DC-to-DC converter from the intermediate value, thereby generating the DC voltage.

4. The controller of claim 1, wherein the first input node is a positive input node, and the second input node is a negative input node.

5. A digital constant on-time (COT) controller adaptable to a direct-current (DC)-to-DC converter, comprising:
- a current sensing circuit that senses stored energy of the DC-to-DC converter, thereby generating a sense voltage;
- a semi-amplitude detector that detects half of a peak-to-peak amplitude of the sense voltage, thereby generating a semi-amplitude voltage;
- a DC voltage detector that detects a DC voltage across an effective series resistor of an energy storage circuit that provides the stored energy of the DC-to-DC converter, thereby generating a DC voltage;
- an arithmetic device that adds the sense voltage and the semi-amplitude voltage, from which the DC voltage and a predetermined reference signal are subtracted; and
- a pulse-width modulation (PWM) generator that generates a switch control signal according to a result of the arithmetic device;

wherein the arithmetic device comprises:
- a comparator with a first input node and a second input node, a comparison result of the comparator being fed to the PWM generator; and
- a first arithmetic device that adds the predetermined reference signal and the DC voltage, from which the semi-amplitude voltage is subtracted, thereby generating a second signal fed to the second input node;
- wherein the sense voltage is provided as a first signal fed to the first input node.

6. The controller of claim 5, wherein the first input node is a positive input node, and the second input node is a negative input node.

7. A digital constant on-time (COT) controller adaptable to a direct-current (DC)-to-DC converter, comprising:
- a current sensing circuit that senses stored energy of the DC-to-DC converter, thereby generating a sense voltage;
- a semi-amplitude detector that detects half of a peak-to-peak amplitude of the sense voltage, thereby generating a semi-amplitude voltage;
- a DC voltage detector that detects a DC voltage across an effective series resistor of an energy storage circuit that provides the stored energy of the DC-to-DC converter, thereby generating a DC voltage;
- an arithmetic device that adds the sense voltage and the semi-amplitude voltage, from which the DC voltage and a predetermined reference signal are subtracted; and
- a pulse-width modulation (PWM) generator that generates a switch control signal according to a result of the arithmetic device;

wherein the arithmetic device comprises:
- a comparator with a first input node and a second input node, a comparison result of the comparator being fed to the PWM generator;
- a first arithmetic device that adds the sense voltage and the semi-amplitude voltage, thereby generating a first signal fed to the first input node; and
- a second arithmetic device that adds the predetermined reference signal and the DC voltage, thereby generating a second signal fed to the second input node.

8. The controller of claim 7, wherein the first input node is a positive input node, and the second input node is a negative input node.

9. A digital constant on-time (COT) controller adaptable to a direct-current (DC)-to-DC converter, comprising:
- a current sensing circuit that senses stored energy of the DC-to-DC converter, thereby generating a sense voltage;
- a semi-amplitude detector that detects half of a peak-to-peak amplitude of the sense voltage, thereby generating a semi-amplitude voltage;
- a DC voltage detector that detects a DC voltage across an effective series resistor of an energy storage circuit that provides the stored energy of the DC-to-DC converter, thereby generating a DC voltage;
- an arithmetic device that adds the sense voltage and the semi-amplitude voltage, from which the DC voltage and a predetermined reference signal are subtracted; and
- a pulse-width modulation (PWM) generator that generates a switch control signal according to a result of the arithmetic device;

wherein the arithmetic device comprises:
- a comparator with a first input node and a second input node, a comparison result of the comparator being fed to the PWM generator;
- a first arithmetic device that subtracts the DC voltage from the sense voltage, thereby generating a first signal fed to the first input node; and
- a second arithmetic device that subtracts the semi-amplitude voltage from the predetermined reference signal, thereby generating a second signal fed to the second input node.

10. The controller of claim 9, wherein the first input node is a positive input node, and the second input node is a negative input node.

11. A digital constant on-time (COT) controller adaptable to a direct-current (DC)-to-DC converter, comprising:
- a current sensing circuit that senses stored energy of the DC-to-DC converter, thereby generating a sense voltage;
- a valley detector that detects a valley value of the sense voltage, thereby generating a valley voltage;
- a comparator with a first input node and a second input node;
- a first arithmetic device that adds the sense voltage and a digital output voltage of the DC-to-DC converter, thereby generating a first signal fed to the first input node;
- a second arithmetic device that adds the valley voltage and a predetermined reference signal, thereby generating a second signal fed to the second input node; and
- a pulse-width modulation (PWM) generator that generates a switch control signal according to a comparison result of the comparator.

12. The controller of claim 11, wherein the valley detector comprises:
- a rising edge-triggered latch circuit that latches the sense voltage triggered on a rising edge of the switch control signal or a digital switch voltage, thereby generating the valley voltage.

13. The controller of claim 11, wherein the first input node is a positive input node, and the second input node is a negative input node.

* * * * *